United States Patent
Sozinho et al.

(10) Patent No.: US 10,494,257 B2
(45) Date of Patent: *Dec. 3, 2019

(54) METHOD AND PLANT FOR CHEMICAL LOOPING OXIDATION-REDUCTION COMBUSTION OF A GASEOUS HYDROCARBON FEEDSTOCK WITH INTERMEDIATE CATALYTIC STEAM REFORMING OF THE FEED

(71) Applicants: IFP Energies nouvelles, Rueil-Malmaison (FR); Total Raffinage Chimie, Courbevoie (FR)

(72) Inventors: Tiago Sozinho, Feyzin (FR); Mahdi Yazdanpanah, Le Havre (FR); Florent Guillou, Ternay (FR); Ann Cloupet, Longes (FR); Stephane Bertholin, Chaponost (FR); Hélène Stainton, Lyons (FR)

(73) Assignees: IFP ENERGIES NOUVELLES, Rueil-Malmaison (FR); TOTAL RAFFINAGE CHIME, Courbevoie (FR)

(*) Notice: Subject to any disclaimer, the term of this patent is extended or adjusted under 35 U.S.C. 154(b) by 58 days.

This patent is subject to a terminal disclaimer.

(21) Appl. No.: 15/534,998

(22) PCT Filed: Dec. 1, 2015

(86) PCT No.: PCT/EP2015/078241
§ 371 (c)(1),
(2) Date: Jun. 9, 2017

(87) PCT Pub. No.: WO2016/091664
PCT Pub. Date: Jun. 16, 2016

(65) Prior Publication Data
US 2017/0320731 A1    Nov. 9, 2017

(30) Foreign Application Priority Data

Dec. 12, 2014   (FR) .................................... 14 62318

(51) Int. Cl.
*C01B 3/44*      (2006.01)
*F23C 10/01*     (2006.01)
(Continued)

(52) U.S. Cl.
CPC .............. *C01B 3/44* (2013.01); *B01J 8/0055* (2013.01); *B01J 8/1827* (2013.01); *B01J 8/26* (2013.01);
(Continued)

(58) Field of Classification Search
CPC ....................................................... C01B 3/44
See application file for complete search history.

(56) References Cited

U.S. PATENT DOCUMENTS

| 5,447,024 A | 9/1995 | Ishida et al. |
| 2009/0263316 A1* | 10/2009 | Iyer .......................... C01B 3/38 423/658.3 |

(Continued)

FOREIGN PATENT DOCUMENTS

| FR | 3001400 A1 | 8/2014 |
| WO | WO 2014/124011 * | 8/2014 |
| WO | 2014/162075 A1 | 10/2014 |

OTHER PUBLICATIONS

International Search Report for PCT/EP2015/078241 dated Jan. 29, 2016; English translation submitted herewith (5 Pages).

*Primary Examiner* — Douglas B Call
(74) *Attorney, Agent, or Firm* — Fitch, Even, Tabin & Flannery, L.L.P.

(57) ABSTRACT

The invention relates to a method and to a plant for chemical looping oxidation-reduction combustion (CLC) of a gaseous hydrocarbon feed, for example natural gas essentially con- (Continued)

taining methane. According to the invention, catalytic steam reforming of the feed is performed between two successive feed combustion steps on contact with an oxidation-reduction active mass in form of particles. The reforming catalyst is arranged in a fixed bed in an intermediate reforming zone (130) between the two reduction zones (120, 140) where the two combustion steps are conducted.

20 Claims, 4 Drawing Sheets

(51) Int. Cl.
*F23C 10/22* (2006.01)
*C01B 3/38* (2006.01)
*B01J 8/26* (2006.01)
*B01J 8/18* (2006.01)
*B01J 8/00* (2006.01)

(52) U.S. Cl.
CPC .............. *C01B 3/382* (2013.01); *F23C 10/01* (2013.01); *F23C 10/22* (2013.01); *B01J 2208/00752* (2013.01); *B01J 2208/00893* (2013.01); *C01B 2203/025* (2013.01); *C01B 2203/0233* (2013.01); *C01B 2203/0238* (2013.01); *C01B 2203/0255* (2013.01); *C01B 2203/06* (2013.01); *C01B 2203/1058* (2013.01); *C01B 2203/1082* (2013.01); *C01B 2203/1094* (2013.01); *C01B 2203/1241* (2013.01); *F23C 2900/99008* (2013.01); *Y02E 20/346* (2013.01)

(56) References Cited

U.S. PATENT DOCUMENTS

| | | |
|---|---|---|
| 2011/0303875 A1 | 12/2011 | Hoteit et al. |
| 2013/0149650 A1* | 6/2013 | Gauthier .................. C10J 3/725 431/7 |
| 2016/0002034 A1* | 1/2016 | Fan .......................... C01B 3/344 252/373 |
| 2016/0061442 A1 | 3/2016 | Yazdanpanah et al. |

* cited by examiner

METHOD AND PLANT FOR CHEMICAL LOOPING OXIDATION-REDUCTION COMBUSTION OF A GASEOUS HYDROCARBON FEEDSTOCK WITH INTERMEDIATE CATALYTIC STEAM REFORMING OF THE FEED

CROSS-REFERENCE TO RELATED APPLICATIONS

This application is a U.S. national phase application filed under 35 U.S.C. § 371 of International Application No. PCT/EP2015/078241, filed Dec. 1, 2015, designating the United States, which claims priority from French Patent Application No. 14/62.318, filed Dec. 12, 2014, which are hereby incorporated herein by reference in their entirety for all purposes.

FIELD OF THE INVENTION

The present invention relates to the field of chemical looping oxidation-reduction combustion (CLC) of hydrocarbons, in particular to the combustion of gaseous hydrocarbons such as methane.

BACKGROUND OF THE INVENTION

Chemical looping combustion or CLC: in the text hereafter, what is referred to as CLC (Chemical Looping Combustion) is an oxidation-reduction or redox looping method on an active mass. It can be noted that, in general, the terms oxidation and reduction are used in connection with the respectively oxidized or reduced state of the active mass. The oxidation reactor is the reactor where the redox mass is oxidized and the reduction reactor is the reactor where the redox mass is reduced.

In a context of increasing world energy demand, capture of carbon dioxide ($CO_2$) for sequestration thereof has become an indispensable means to limit greenhouse gas emissions harmful to the environment. The CLC process allows to produce energy from hydrocarbon-containing fuels while facilitating capture of the $CO_2$ emitted upon combustion.

The CLC method consists in using redox reactions of an active mass, typically a metal oxide, for splitting the combustion reaction into two successive reactions. A first oxidation reaction of the active mass, with air or a gas acting as the oxidizer, allows the active mass to be oxidized. This reaction is highly exothermic and it generally develops more energy than the combustion of the feed. A second reduction reaction of the active mass thus oxidized, by means of a reducing gas from the hydrocarbon feed, then allows to obtain a reusable active mass and a gas mixture essentially comprising $CO_2$ and water, or even syngas containing hydrogen ($H_2$) and carbon monoxide (CO). This reaction is generally endothermic. This technique thus enables to isolate the $CO_2$ or the syngas in a gas mixture practically free of oxygen and nitrogen.

The balance of the chemical looping combustion, i.e. of the two previous reactions, is globally exothermic and it corresponds to the heating value of the treated feed. It is possible to produce energy from this process, in form of vapour or electricity, by arranging exchange surfaces in the active mass circulation loop or on the gaseous effluents downstream from the combustion or oxidation reactions.

U.S. Pat. No. 5,447,024 describes for example a chemical looping combustion method comprising a first reactor for reduction of an active mass by means of a reducing gas and a second oxidation reactor allowing to restore the active mass in its oxidized state through an oxidation reaction with wet air. The circulating fluidized bed technology is used to enable continuous change of the active mass from the oxidized state to the reduced state thereof.

The active mass going alternately from the oxidized form to the reduced form thereof and conversely follows a redox cycle.

Thus, in the reduction reactor, active mass $M_xO_y$ is first reduced to the state $M_xO_{y-2n-m/2}$ by means of a hydrocarbon $C_nH_m$ that is correlatively oxidized to $CO_2$ and $H_2O$, according to reaction (1), or optionally to a mixture $CO+H_2$, depending on the proportions used.

$$C_nH_m + M_xO_y \rightarrow n\,CO_2 + m/2\,H_2O + M_xO_{y-2n-m/2} \quad (1)$$

In the oxidation reactor, the active mass is restored to its oxidized state $M_xO_y$ on contact with air according to reaction (2), prior to returning to the first reactor.

$$M_xO_{y-2n-m/2} + (n+m/4)\,O_2 \rightarrow M_xO_y \quad (2)$$

In the above equations, M represents a metal.

The efficiency of the circulating fluidized bed chemical looping combustion method is based to a large extent on the physico-chemical properties of the redox active mass.

The reactivity of the redox pair(s) involved and the associated oxygen transfer capacity are parameters that influence the dimensioning of the reactors and the rates of circulation of the particles. The life of the particles depends on the mechanical strength of the particles and on the chemical stability thereof.

In order to obtain particles usable for this method, the particles involved generally consist of a redox pair selected from among CuO/Cu, $Cu_2O$/Cu, NiO/Ni, $Fe_2O_3$/$Fe_3O_4$, FeO/Fe, $Fe_3O_4$/FeO, $MnO_2$/$Mn_2O_3$, $Mn_2O_3$/$Mn_3O_4$, $Mn_3O_4$/MnO, MnO/Mn, $Co_3O_4$/CoO, CoO/Co, or of a combination of some of these redox pairs, and sometimes a binder providing the required physico-chemical stability.

In general, and in particular in case of combustion of a gas feed of natural gas type, a high hydrocarbon conversion level, conventionally above 98%, is targeted while limiting the residence time of the reactants in the reaction zones in order to keep a realistic equipment size. These constraints require using a very reactive redox pair, which reduces the selection of the possible materials.

The NiO/Ni pair is often mentioned as the reference active mass for the CLC process for its oxygen transport capacities and its fast reduction kinetics, notably in the presence of methane. However, a major drawback is that nickel oxide has a high toxicity value, and it is classified as a CMR1 substance: Carcinogenic, Mutagenic or toxic for Reproduction of class 1, leading notably to significant constraints on the fumes filtration system. Furthermore, it has high cost. Indeed, since nickel oxide does not naturally occur with a sufficient concentration to allow interesting properties for the CLC process to be obtained, it is generally used concentrated in synthetic active mass particles whose manufacturing cost is high.

It can be noted that, in addition to the manufacturing cost, the cost of the active mass in a CLC process also involves the make-up active mass item, which can represent a significant part of the operating cost as a result of a continuous consumption of solid due to the inevitable attrition linked with the circulation of solid in the reactors where the gas velocities are relatively high. Thus, the cost related to the active mass is particularly high for synthetic particles, as opposed to particles obtained from some natural ores that can be less expensive.

Indeed, the use of natural ores as active mass for the CLC process, such as ilmenite or manganese ores, which can provide a satisfactory solution in terms of cost, is also known.

However, the use of such ores is generally less suited for combustion of gas feeds such as methane than for the combustion of solid or liquid feeds, in terms of process performance and of feed conversion ratio.

It is also known to use mixtures of natural metal oxides extracted from ores with nickel oxide.

Patent application WO-2014/068,205 concerns for example a CLC method using an active mass comprising a natural manganese ore of pyrolusite type enriched with nickel oxide, which notably allows to improve the CLC process performances in terms of hydrocarbon feed conversion ratio. However, a major drawback of such a method is that the nickel oxide is part of the active mass that circulates in the chemical loop and produces fines through attrition. The presence of nickel particles in the fines is unwanted due to the toxicity of nickel oxide, which limits the amount of nickel oxide that can be used and induces considerable constraints on the filtration of the effluents resulting from the combustion.

There is therefore a need for an efficient CLC process, notably in terms of feed conversion, suited to the treatment of a gaseous hydrocarbon feed and that can use an inexpensive material for the redox active mass, complying with environmental standards in terms of toxicity and reducing emissions.

SUMMARY OF THE INVENTION

In order to meet this need and to overcome at least partly the aforementioned drawbacks of the prior art, the applicants intend to carry out a step of catalytic steam reforming of the gas feed between two successive steps of combustion of the feed on contact with the oxygen carrier. The reforming catalyst is arranged in a fixed bed in an intermediate reforming zone between two reduction zones where the steps of combustion of the feed on contact with the oxygen carrier are carried out.

The first combustion step in the first reduction zone allows both to start conversion of the feed and to increase the vapour fraction present in the feed, which is subsequently fed to the catalytic steam reforming zone. The second combustion step in the second reduction zone completes the combustion of the reformed feed that comprises a significant part of syngas produced during the reforming process.

The present invention aims to achieve a feed conversion ratio of the order of 98% or more. Indeed, using such an intermediate steam reforming zone allows to convert all or part of the gaseous hydrocarbon feed to syngas ($CO+H_2$) prior to its combustion in the second reduction zone, while using the reaction heat from the CLC loop. The reaction kinetics of the syngas with the oxygen carrier being higher than that of the gaseous hydrocarbon feed with the oxygen carrier, the CLC process performances are improved while limiting the residence time of the feed on contact with the oxygen carrier in order to limit the size of the reactors used.

Besides, the syngas having good reactivity with most oxygen-carrying materials, in particular with inexpensive ores, it is then possible to minimize the costs related to the redox active mass while providing an effective CLC process in terms of feed conversion ratio. Indeed, despite the fact that ores do generally not have a sufficient catalytic activity to induce in-situ reforming of the hydrocarbon feed, i.e. reforming in the reduction zone, as would be the case with nickel oxide for example, the present invention however allows to effectively ensure reforming of the feed.

Thus, the present invention relates, according to a first aspect, to a method for chemical looping oxidation-reduction combustion of a gaseous hydrocarbon feed, comprising:
  sending the gaseous hydrocarbon feed to a first fluidized-bed reduction zone to perform partial combustion of the gaseous hydrocarbon feed on contact with a first stream of particles of a redox active mass,
  separating the redox active mass particles and a gas stream contained in a mixture coming from the first reduction zone in order to send the gas stream to a reforming zone,
  carrying out catalytic steam reforming of the gas stream in the reforming zone comprising a reforming catalyst fixed bed in order to produce a gaseous effluent comprising syngas,
  sending the gaseous effluent to a second fluidized-bed reduction zone to perform combustion of the gaseous effluent on contact with a second stream of particles of a redox active mass,
  oxidizing the redox active mass particles that have stayed in the first and second reduction zones by contacting with an oxidizing gas stream in a fluidized-bed oxidation zone.

According to an embodiment of the invention, at least part of the oxidized active mass particles is separated from an oxygen-depleted oxidizing gas stream after oxidation in the oxidation zone in order to form the first particle stream fed to the first reduction zone, and the second particle stream fed to the second reduction zone is made up of the active mass particles coming from the first reduction zone and separated from the gas stream.

According to another embodiment of the invention, at least part of the oxidized active mass particles is separated from an oxygen-depleted oxidizing gas stream after oxidation in the oxidation zone in order to form the first particle stream fed to the first reduction zone and the second particle stream fed to the second reduction zone.

According to this embodiment, said at least part of the oxidized active mass particles separated from the oxygen-depleted oxidizing gas stream can be sent to a tank prior to separating said at least part of the oxidized particles into said first particle stream and said second particle stream.

Advantageously, the partial combustion in the first reduction zone is controlled in such a way that steam is produced in sufficient amount for catalytic steam reforming of said gas stream.

Preferably, the steam to carbon ratio S/C is greater than or equal to 1.5 in the gas stream from the first reduction zone.

Preferably, the gaseous hydrocarbon feed conversion ratio ranges between 40% and 80%, more preferably between 40% and 60%, in the first reduction zone.

According to an embodiment of the invention, redox active mass fines carried along with said gas stream are collected before said gas stream flows into the reforming zone by decreasing the gas velocity in a collection zone arranged between the first reduction zone and the reforming zone.

According to an embodiment of the invention, a heat exchange is performed between the reforming catalyst fixed bed and the fluidized bed of the second reduction zone by means of vertical tubes made of a thermally conductive material, such as metal tubes contiguous to the fixed bed and the fluidized bed.

According to the present invention, the gaseous hydrocarbon feed preferably comprises essentially methane and the methane reforming catalyst preferably comprises nickel.

Advantageously, the redox active mass is made up of metal oxides extracted from ores.

According to a second aspect, the present invention relates to a plant for combustion of a gaseous hydrocarbon feed according to the described method. The plant comprises:
- a first reduction zone provided, at the base thereof, with means of injecting said gaseous hydrocarbon feed and with an inlet for a first stream of a redox active mass in form of particles, and provided at the top thereof with an outlet for a mixture comprising a gas stream and the active mass particles,
- a separation device receiving the mixture for separating the gas stream from the active mass particles,
- a steam reforming zone comprising a reforming catalyst fixed bed, an inlet for the gas stream at the base of the fixed bed and an outlet for a gaseous effluent comprising syngas,
- a second reduction zone provided, at the base thereof, with an inlet for said gaseous effluent and a feed point for a second redox active mass stream in form of particles, and provided at the top thereof with an outlet for fumes,
- an oxidation zone provided, at the base thereof, with a feed point for redox active mass particles that have stayed in the first and second reduction zones and with means of injecting an oxidizing fluidization gas, and provided at the top thereof with an outlet for an oxygen-depleted oxidizing gas and oxidized redox active mass particles.

According to an embodiment, the feed point for said second particle stream of the second reduction zone is connected to said separation device.

According to another embodiment, the plant comprises a second separation device receiving the oxygen-depleted oxidizing gas and the oxidized redox active mass particles from the oxidation zone, the inlet for the first particle stream in the first reduction zone and the feed point for said second particle stream of the second reduction zone are each connected to said second separation device, preferably by means of a tank.

According to an embodiment, the first reduction zone is made up of a first reactor, the reforming zone and the second reduction zone are both integrated in a second reactor, and this second reactor comprises vertical tubes made of a thermally conductive material, such as metallic tubes, contiguous to the fixed bed and to a fluidized bed of the second reduction zone for achieving a heat exchange between said fixed bed and said fluidized bed.

According to an embodiment, the plant further comprises a collection zone provided between the first reduction zone and the reforming zone for collecting the oxygen carrier fines carried along in the gas stream. This collection zone is preferably part of a reactor including the second reduction zone, and it preferably comprises a truncated part whose vertex is in contact with the reforming zone.

BRIEF DESCRIPTION OF THE FIGURES

Other features and advantages of the invention will be clear from reading the description hereafter of embodiments given by way of non limitative example, with reference to the accompanying figures wherein.

In the figures, the same reference numbers designate identical or similar elements.

DETAILED DESCRIPTION OF THE INVENTION

It can be noted that, in the present description, what is referred to as "intermediate reforming" of the gaseous hydrocarbon feed is reforming conducted between two reduction zones, as opposed to "in-situ" reforming, understood to be here reforming of the feed within the reduction zone. It is reminded that a reduction zone must be understood here, in connection with the definition of the CLC process given above, as a reaction zone where the redox mass is reduced. The reforming reaction is detailed below in connection with the description of FIG. 1.

In the present description, the expressions "oxygen-carrying material", "oxygen carrier", "redox mass" and "redox active mass" are equivalent. The redox mass is referred to as active in connection with the reactive capacities thereof, in the sense that it is capable of acting as an oxygen carrier in the CLC process by capturing and releasing oxygen. The abbreviated expression "active mass" or the term "solid" can also be used.

In the CLC method according to the invention, the hydrocarbon feeds used are gaseous hydrocarbon feeds, preferably consisting essentially of methane, natural gas or a biogas for example.

The present invention aims to use a fixed-bed steam reforming catalyst at an intermediate feed combustion step, i.e. after a first reduction step in a first conventional reduction zone, so as to take advantage, for reforming, of the vapour production generated by the partial conversion of the feed during the first reduction step.

Figure 1:
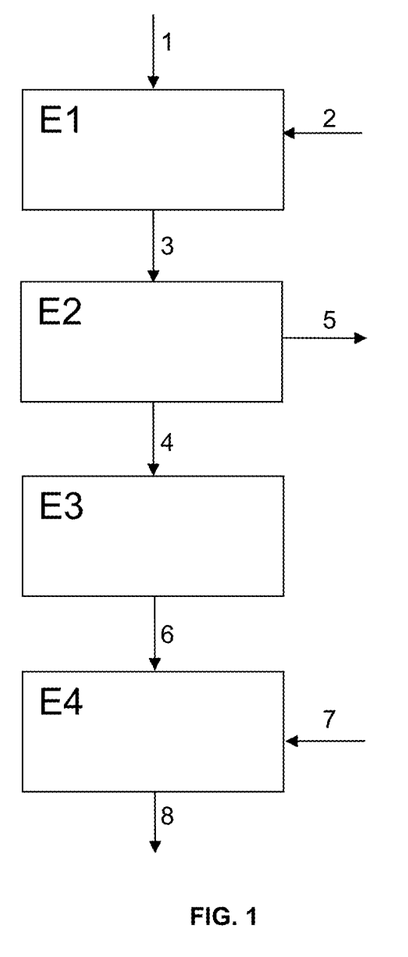
FIG. 1 is a simplified flow chart of the CLC process according to the invention, showing the main steps involving the gaseous hydrocarbon feed, FIG. 2 schematically shows a CLC plant according to a first embodiment of the invention, comprising two successive reduction reactors with an intermediate reforming zone and a series circulation of the oxygen carrier in relation to the two reduction reactors, FIG. 3 schematically shows a CLC plant according to a second embodiment of the invention, comprising two successive reduction reactors with an intermediate reforming zone and a parallel circulation of the oxygen carrier in relation to the two reduction reactors.

FIG. 1 schematically shows the sequence of the main steps of the CLC process according to the invention, involving the gaseous hydrocarbon feed. The other steps of the CLC loop, such as the oxygen carrier oxidation step, are not shown.

The sequence of steps E1 to E4 illustrated in FIG. 1 takes place as described hereafter.

E1: First Reduction Step

A first reduction step E1 consists in contacting all of the gaseous hydrocarbon feed 1, natural gas for example, with oxygen carrier 2 from the oxidation reactor. This contacting is achieved in a fluidized-bed reduction zone such as a substantially elongate and vertical reactor commonly referred to as "riser".

The global reaction is reaction (1) described above. More specifically, in the case of gaseous hydrocarbon feed conversion in a CLC process, as in the present invention, two steps can be distinguished. First, the hydrocarbon molecule is converted to a syngas on the oxygen carrier according to Equation (3), then the syngas formed is oxidized on the oxygen carrier to CO and $H_2$ according to Equations (4) and (5). The syngas conversion reactions according to Equations (4) and (5) exhibit very high kinetics in comparison with the formation reaction of this syngas according to Equation (3).

(3)

(4)

(5)

The heat required for the reaction is supplied by the oxygen carrier.

The fluidized bed temperature typically ranges between 700° C. and 1100° C., for example of the order of 950° C.

Only partial conversion of the feed is achieved in this step E1. The feed conversion is such that the amount of vapour produced is sufficient to allow subsequent reforming of the feed in the intermediate reforming zone, in particular the amount of vapour produced must be sufficient to provide a steam to carbon ratio S/C conducive to the catalytic steam reforming reactions that take place in the intermediate steam reforming zone.

Preferably, the feed conversion ratio ranges between 40% and 80%, preferably between 40% and 60%.

The conversion ratio represents the fraction of reactant i that reacts during a chemical reaction. It is defined as follows:

$$X_i = (n_{i,0} - n_{i,t})/n_{i,0}$$

with X the conversion ratio of reactant i, n the amount of matter (in moles), indices 0 and t representing the initial state and a given subsequent time respectively.

Preferably, ratio S/C is greater than 1.5. Such a ratio allows to minimize coke formation on the catalyst, as explained below in connection with steam reforming step E3.

The contact time in this first reduction zone typically ranges between 1 second and 1 minute, preferably between 1 s and 20 s.

Thus, the partial combustion is preferably controlled in this first reduction zone so that steam is produced in sufficient amount to perform subsequent steam reforming of the feed in the reforming zone. In order to obtain the desired feed conversion ratio and steam amount, the solid flow and the oxygen carrier temperature are for example varied according to the gas feed flow rate.

The redox mass can consist of metal oxides such as, for example, Fe, Ti, Ni, Cu, Mn, Co, V oxides, alone or in admixture, which can be extracted from ores, such as ilmenite ($FeTiO_3$) or a natural manganese ore such as pyrolusite ($MnO_2$), or synthetic (for example iron oxide particles supported on alumina $Fe_2O_3/Al_2O_3$), with or without a binder, and it has the required redox properties and the characteristics necessary for performing fluidization.

Advantageously, the redox mass is obtained from ores, generally less expensive than synthetic particles. According to the invention, the reforming process carried out in step E3 actually allows this type of active mass to be used since the syngas resulting from reforming exhibits good reactivity with most oxygen-carrying materials. The ore can be previously crushed and screened in order to obtain an active mass of grain size compatible with fluidized-bed operation.

The oxygen storage capacity of the redox mass advantageously ranges, depending on the material type, between 1 and 15 wt. %. Advantageously, the amount of oxygen effectively transferred by the metal oxide ranges between 1 and 3 wt. %, which allows only a fraction of the oxygen transfer capacity, ideally less than 30% thereof, to be used so as to limit risks of mechanical aging or particle agglomeration. Using a fraction only of the oxygen transport capacity also affords the advantage that the fluidized bed acts as a thermal ballast and thus smoothes the temperature variations imposed by the reactions.

The active mass comes in form of fluidizable particles belonging to groups A or B of Geldart's classification. By way of non-limitative example, the redox active mass particles can belong to group B of Geldart's classification, with a grain size such that over 90% of the particles have a size ranging between 50 μm and 500 μm (Sauter mean diameter), preferably between 100 μm and 300 μm, for a density ranging between 1000 kg/m$^3$ and 6000 kg/m$^3$, preferably between 1500 kg/m$^3$ and 5000 kg/m$^3$.

The redox active mass can be subjected to an activation step so as to increase the reactive capacities thereof; it can consist of a temperature rise phase, preferably progressive, and preferably in an oxidizing atmosphere, in air for example.

E2: Gas/Solid Separation Step

After first reduction step E1, the mixture comprising the partly converted gas feed and the oxygen carrier particles is subjected to a separation step allowing the oxygen carrier to be separated from the gas fraction within the mixture. Mixture 3 from the first reduction zone is therefore sent to solid/gas separation means known to the person skilled in the art, such as a cyclone provided at the top of the first reduction reactor.

Gas fraction 4, essentially consisting of gaseous hydrocarbons, steam, $CO_2$ and syngas ($CO+H_2$), is sent to an intermediate reaction zone for a catalytic steam reforming step E3. Solid fraction 5 comprising the oxygen carrier particles is sent to the oxidation reactor to be oxidized again (not shown), or it is alternatively sent to a second reduction zone to undergo a second reduction step E4 intended to complete the combustion of the gaseous hydrocarbon feed.

E3: Catalytic Steam Reforming Step

This step consists in performing steam reforming of gas fraction 4 on contact with a fixed-bed steam reforming catalyst. This step provides deep conversion of the gaseous hydrocarbon feed, methane for example, to syngas ($H_2+CO$).

This catalytic reforming reaction with steam is summarized by Equation (6) below. The steam was produced during the previous reduction step E1. The catalytic reaction according to Equation (7) can also occur between the $CO_2$ present and the gaseous hydrocarbon feed and similarly produce syngas (reforming known as "dry"). The steam reforming reaction remains the reaction with the greatest impact on the conversion of the feed in relation to dry reforming.

Preferably, the reactant residence time in this steam reforming zone is such that the gaseous hydrocarbon feed is almost totally converted. Typically, the residence time is very short in this steam reforming zone and it preferably ranges between 50 ms and 1 s, more preferably between 0.1 s and 1 s. This residence time can vary depending on the temperature at which steam reforming is conducted, knowing that the steam reforming reaction is generally favoured when the temperature increases.

Gaseous effluent 6 produced during this stage E3 then essentially consists of syngas, $CO_2$, steam and residual gaseous hydrocarbons, for example less than 5% residual gaseous hydrocarbons or even less than 1%.

Any type of catalyst suited for reforming of the gaseous hydrocarbon feed, generally well known to the person skilled in the art, can be used. By way of non limitative example, a catalyst with a nickel-based active phase is used for reforming of a feed predominantly comprising methane on contact with steam, according to the well known steam methane reforming (SMR) reaction. The steam methane reforming reaction is summarized by Equation (8) below:

This reaction is generally strongly endothermic and it requires energy supply. In conventional industrial processes dedicated to reforming, two energy supply modes are generally applied: either introduction of free oxygen into the reaction medium to provide partial oxidation of the feed whose exotherm compensates for the endothermicity of the reforming reaction, or external heating.

According to the present invention, the heat produced by the CLC loop is used to provide the energy required for the steam reforming reaction.

In particular, the heat is transmitted to the catalyst fixed bed of the steam reforming zone by the hot gas stream coming from the first fluidized-bed reduction zone, which feeds said steam reforming zone, and by the heat of the fluidized bed of the second reduction zone downstream from the catalytic steam reforming zone, as described below in connection with FIG. 5 for example. The temperature of the circulating fluidized bed of the CLC loop ranges between 700° C. and 1100° C. These temperature levels of the circulating fluidized bed are indeed compatible with the conventional operating temperatures of catalytic reforming reactions. Typically, the temperature of the catalytic reforming reaction in the intermediate steam reforming zone ranges between 700° C. and 900° C.

The catalyst comes in form of a particle fixed bed, preferably positioned at the base of a second reactor that also contains, downstream from the fixed bed, a fluidized-bed reduction zone for a second step of reduction of the oxygen carrier on contact with gaseous effluent 6 from the steam reforming zone (step E4).

The particles of the fixed bed can be monometallic catalytic particles supported on various metal oxides such as, by way of non limitative example, alumina $Al_2O_3$, calcium oxide CaO, magnesium oxide MgO, mixed oxides such as $Al_2O_3$—CaO. Preferably, the particles have a nickel base as the active phase, notably in the case of combustion of a hydrocarbon feed essentially containing methane, and they preferably contain 6 to 25 wt. % nickel, for example on a support predominantly comprising alumina $Al_2O_3$. Such a catalyst comprising nickel supported on alumina is typically used for hydrogen production and it is generally used with excess steam so as to limit the formation of coke on the catalyst. In such a context of industrial hydrogen production, the molar ratio between the steam and the carbon contained in the feed (steam/carbon ratio S/C calculated on moles) generally ranges between 2.5 and 3.5, preferably between 2.5 and 3, in order to guarantee the lifetime of the catalyst.

Excess steam is also preferable for the steam reforming process according to the present invention. The operating conditions in the first reduction zone are such that the amount of steam conducive to the reforming reactions can be obtained. Advantageously, an S/C ratio greater than or equal to 1.5 is enough to minimize the formation of coke on the catalyst according to the present invention, thus allowing to durably maintain its activity and its mechanical strength, whereas higher values, generally ranging between 2.5 and 3.5, are conventionally encountered in steam reforming for hydrogen production.

The present invention does not rule out the possibility of including an injection of additional steam, i.e. in addition to the steam from the reactions in the first reduction reactor, into the steam reforming zone. In this case, this additional steam injection can come in form of a dedicated feed point, with steam fed into the process, or recycle of the fumes from the second reduction zone.

E4: Second Reduction Step

Gaseous effluent 6 from steam reforming step E3 is sent to the second reduction zone to complete the combustion of the gas feed. In this second fluidized-bed reduction zone, effluent 6 is contacted with an oxygen carrier particle stream 7 coming from the oxidation zone, or from the first reduction zone after separation in step E2.

This second reduction step aims to convert the syngas and the residual hydrocarbons of effluent 6 so as to produce combustion fumes 8 comprising almost exclusively $CO_2$ and $H_2O$.

This effluent 6 is enriched in syngas in relation to raw hydrocarbon feed 1, which allows to improve the global kinetics of conversion of the feed to water vapour and $CO_2$ on contact with the redox active mass, in comparison to a conventional CLC process without intermediate steam reforming (see Equations 3, 4, 5 above).

This second reduction zone preferably comes in form of a substantially elongate and vertical reactor of riser type.

The heat necessary for the reaction is supplied by oxygen carrier 7 and gaseous effluent 6. The fluidized bed temperature typically ranges between 700° C. and 1100° C., of the order of 950° C. for example.

Preferably, the feed conversion ratio at the end of this second step, including conversion of the feed in the first reduction step, is greater than or equal to 98%.

The contact time in this second reduction zone typically ranges between 1 s and 1 minute, preferably between 1 s and 20 seconds.

Figure 2:
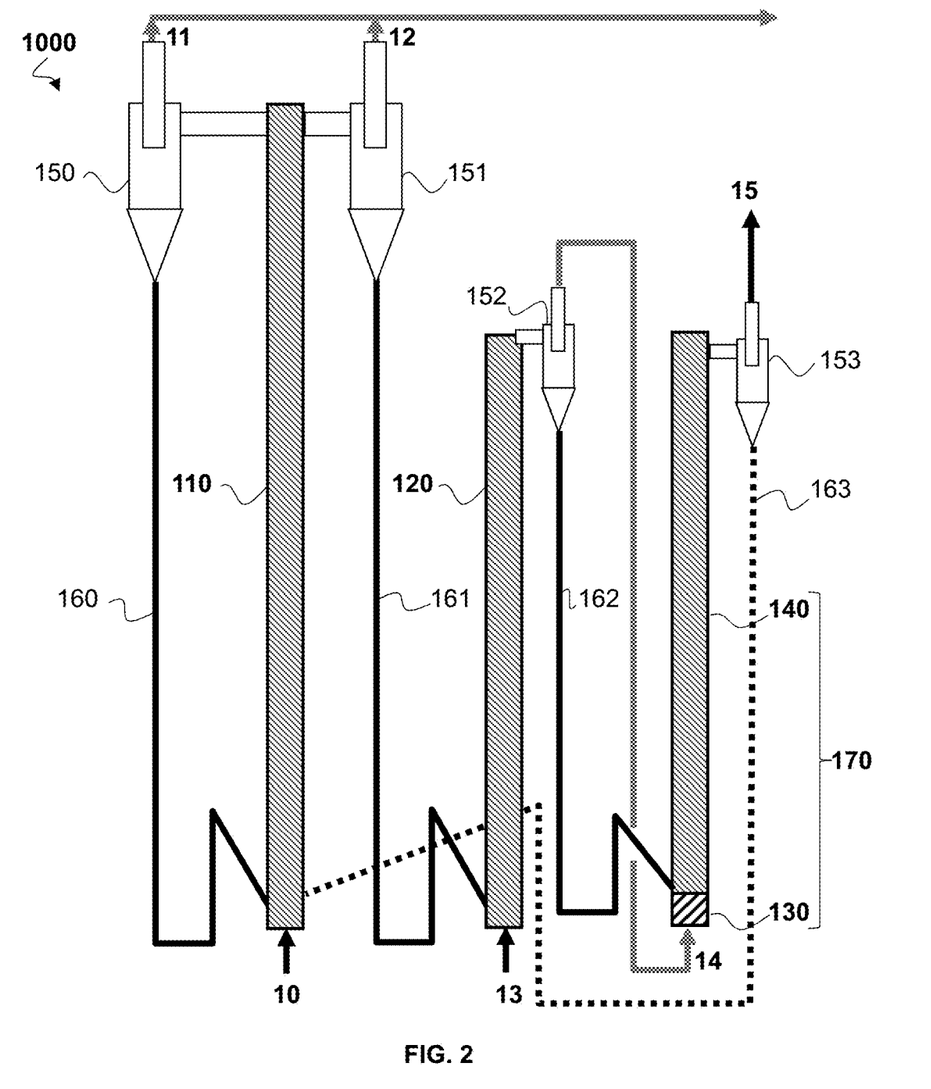

FIG. 2 is a simplified block diagram of the CLC plant according to a first embodiment of the invention.

Chemical looping combustion plant 1000 comprises an oxidation zone 110, also referred to as oxidation reactor or "air reactor", whose function is to oxidize the oxygen carrier in form of particles coming from a reduction zone 140, also referred to as reduction reactor or "fuel reactor". The function of zone 140 is, in combination with another reduction zone 120, to achieve reduction of the oxygen carrier on contact with a gas feed (13, 14) so as to release the oxygen of the carrier and to perform combustion of the feed. Oxidation reactor 110 and the two reduction zones 120 and 140 are operated in fluidized bed mode, and the oxygen carrier circulates between oxidation zone 110 and the two reduction zones 120/140 so as to form the chemical looping combustion loop.

The oxygen carrier from reduction zone 140, separated from combustion fumes 15 in a cyclone 153, is sent to oxidation reactor 110 in an entirely or partially reduced state. It is carried in an ascending flow co-current with an oxidizing gas stream 10, such as air, within oxidation reactor 110, and it reacts on contact with said oxidizing gas according to reaction (2) described above. This results in an oxidizing gas stream depleted in oxygen, depleted air for example, and an oxygen-carrying solid stream oxidized again.

The oxygen-depleted oxidizing gas stream is separated from the oxygen-carrying solid stream at the top of oxidation reactor 110 by a gas/solid separation system. Two gas/solid separation devices 150 and 151 such as cyclones are therefore used. Part of the gas/solid mixture discharged at the top of reactor 110 is sent to cyclone 150 in order to separate oxygen-depleted oxidizing gas 11 from an oxygen-carrying solid stream flowing back to reactor 110 through a siphon 160 to be further oxidized. Another part of the gas/solid mixture discharged at the top of reactor 110 is sent to cyclone 151 in order to separate oxygen-depleted oxidizing gas 12 from another oxygen-carrying solid stream that is sent, through siphon 161, to first reduction reactor 120.

Oxidation zone 110 is thus provided with a first feed point for an oxygen carrier from reduction zone 120, a second feed point for an oxygen carrier from oxidation zone 110, injection means for oxidizing gas 10 allowing fluidization of the oxygen carrier particles and a gas/solid mixture outlet for the oxygen-depleted oxidizing gas and the oxidized oxygen carrier. The oxygen carrier feed points and the oxidizing gas injection means are positioned at the base of oxidation zone 110. The oxygen carrier feed points are located in the lower part of the reactor, above the injection means for oxidizing gas 10 that are provided in the reactor bottom. The gas/solid mixture outlet is positioned at the top of oxidation zone 110.

First reduction step E1 described above is carried out in first reduction reactor 120: partial conversion of gaseous hydrocarbon feed 13 is conducted by contacting with all of the oxidized oxygen-carrying solid stream from oxidation reactor 110 delivered by siphon 161. The oxygen carrier reduction releases the oxygen acting as the oxidizer to achieve global reaction (1).

Reduction zone 120 is operated in fluidized bed mode with an ascending co- current flow of the oxygen carrier particles and of feed 13. Fluidization is provided by gas feed 13. An additional fluidization gas can be used, whose nature is compatible with the process, such as water vapour or $CO_2$ or a mixture thereof.

First reduction zone 120 thus comprises injection means for gas feed 13, preferably an injection crown or any other suitable means (perforated plate, bubble-cap tray, injection nozzle, diffuser, etc.), an inlet for the oxygen carrier and an outlet for the mixture comprising the gas stream produced upon combustion and the partly reduced oxygen carrier particles.

At the top of reactor 120, the gas/solid mixture consisting of the oxygen carrier particles and the gas stream comprising the partly converted gaseous hydrocarbon feed, mainly composed of the initial hydrocarbon feed and $H_2O$, $CO_2$, CO and $H_2$, is sent to a gas/solid separation system 152 such as a cyclone to carry out separation step E2 as described above. Gas stream 14 from cyclone 152 is sent to reforming zone 130 comprising a reforming catalyst fixed bed and located at the base of a second reduction reactor 170 integrating second reduction zone 140. The oxygen carrier particles resulting from the separation in cyclone 152 are also sent to reduction reactor 170, through a siphon 162, but above reforming zone 130, directly into second reduction zone 140. Siphon 162 thus opens above the catalyst fixed bed of reforming zone 130, i.e. downstream from this zone considering the direction of circulation of the gas stream. Thus, the oxygen carrier particles are not involved in the reactions that occur within reforming zone 130.

Taking advantage of the vapour production generated by the partial conversion of feed 13 in first reduction reactor 120, the compounds of gas stream 14 react on contact with the reforming catalyst with a desired S/C ratio in zone 130, as described above in connection with reforming step E3.

The gas mixture from zone 130 flows into second reduction zone 140 where the gas feed combustion is completed, as described above in connection with step E4. Second reduction zone 140 is operated, like first reduction reactor 120, in fluidized bed mode with an ascending co-current flow of the particles and feed 14. Fluidization is provided by gas feed 14. Nearly total conversion of the feed, to $CO_2$ and $H_2O$, is obtained at the top of the second reduction reactor. The oxygen-carrying solid is separated from combustion fumes 15 at the top of the second reduction reactor by a gas/solid separation device 153, e.g. a cyclone, and sent to oxidation reactor 110 via a siphon 163 in order to be oxidized again.

Second reduction reactor 170 thus comprises a reforming zone 130 including a fixed catalyst bed and topped by a reduction zone 140, an inlet for gas feed 14 at the base of the fixed bed, an inlet positioned above the fixed bed for the oxygen carrier coming from the first reduction reactor, and an outlet for combustion fumes 15 and the reduced oxygen carrier particles.

In order to limit pressure drops in the catalyst fixed bed within the steam reforming zone, the flow cross-section of the gas stream entering the steam reforming zone can be larger than the rest of the second reactor. For example, the diameter in the bottom of the second reactor where the steam reforming zone is arranged can be larger than that of the other parts downstream from the reactor, i.e. the second reduction zone. By multiplying for example by two the diameter of the catalyst fixed bed zone, we thus divide by four the gas velocity, thereby decreasing the pressure drop directly related to the gas velocity.

In this first embodiment, the circulation of the oxygen carrier takes place in series in relation to the two reduction reactors 120 and 170, hence the expression "series mode" used in the present description to describe it.

Preferably, within the scope of the present invention where total combustion is sought at the end of the two reduction steps, with fumes 15 nearly exclusively consisting of $CO_2$ and $H_2O$, where the $CO_2$ can be designed to be transported and stored, it is advantageous to operate at low pressure, ranging from atmospheric pressure to less than 3 bars for example, in order to minimize the gaseous effluent compression energy cost and thus to maximize the energy efficiency of the plant.

The balance of the heat of the reactions conducted in zones 110, 120, 130 and 140 is equal to the heating value of feed 13, in the same way as if the combustion thereof had been performed in a conventional combustion process. The heat produced by the CLC loop is used to provide the energy required for the steam reforming reaction as described above in connection with steam reforming step E3.

It is understood that the transport lines in which the oxygen carrier circulates, which comprise the gas/solid separation devices, e.g. cyclones (150, 151, 152, 153) and siphons (160, 161, 162, 163) as shown in FIG. 1, can further comprise other devices of the same type or different, among which, by way of non exhaustive example, solid flow control devices such as mechanical or pneumatic valves, elutriation devices, heat exchange devices, or other sealing elements than siphons.

Figure 3:
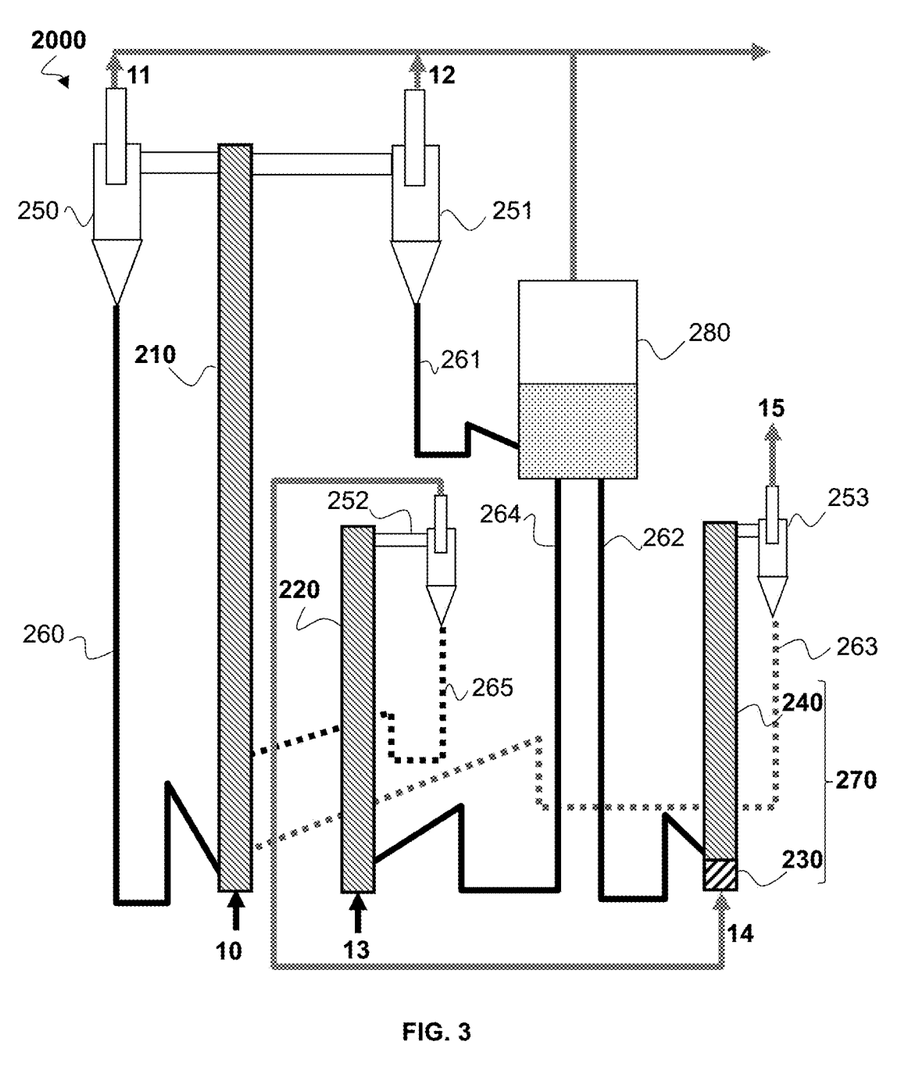

FIG. 3 shows a simplified block diagram of the CLC plant according to a second embodiment of the invention.

This second embodiment differs from the first in that the oxygen carrier solid stream from the oxidation step, not recycled to the oxidation zone, is divided into two substreams, each one feeding a reduction zone. This second embodiment is also referred to as a "parallel mode" where the circulation of the oxygen carrier occurs in parallel in relation to the two reduction reactors, as opposed to the series mode illustrated in FIG. 2.

Oxidation zone 210 and the two reduction zones 220 and 240, as well as steam reforming zone 230, have the same functions and operate in the manner as described for plant 1000.

Oxidation zone 210 of CLC plant 2000 is identical to that of plant 1000, except that it comprises a third inlet for the reduced oxygen carrier coming from first reduction zone 220.

According to this second embodiment, plant 2000 comprises, like plant 1000, two gas/solid separation devices 250 and 251 such as cyclones for separating the oxygen-depleted oxidizing gas stream from the oxygen-carrying solid stream at the top of oxidation reactor 210. Cyclone 250 allows separation of an oxygen-carrying solid stream that flows back via siphon 260 to oxidation zone 210. Siphon 251 allows separation of another oxygen-carrying solid stream from reactor 210, which is sent through siphon 261 to a buffer tank 280 acting as a container for intermediate storage of the oxygen carrier. Two oxygen-carrying solid substreams are generated at the outlet of buffer tank 280, one being sent to first reduction reactor 220 via siphon 264, the other being sent to second reduction reactor 270 via siphon 262, which opens into reduction zone 240 above the catalyst fixed bed of steam reforming zone 230. Buffer tank 280 enables simple management of the solid level variation in the siphon legs, thus allowing to manage the pressure variations and the pressure drop in the process.

A cyclone 252 allows to separate, in the mixture obtained at the top of reactor 220, the oxygen carrier particles that are sent to oxidation reactor 210 through siphon 265 from gas stream 14 sent to reforming zone 230.

At the top of reduction zone 240 of second reduction reactor 270, a cyclone 253 allows to separate fumes 15 from the oxygen carrier particles that are sent to oxidation reactor 210 through siphon 263.

The oxygen carrier that is reduced in second reduction zone 240 thus is advantageously a "fresh" carrier coming from oxidation reactor 210, which has not been sent through the first reduction zone as in plant 1000.

The heat available for the steam reforming reaction in zone 230, which can partly come from the oxygen carrier in the fluidized bed of reduction zone 240, is higher than in the first embodiment.

It is also possible, with this configuration, to regulate the flow rate of the two oxygen carrier sub-streams according to the desired operating conditions in each of the two reduction zones 220 and 240, independently or not, by providing the lines carrying the solid sub-streams to the reactors with suitable devices, such as mechanical or pneumatic valves, L-valves for example. Such a regulation can allow greater flexibility as regards the thermal balance, or it can be useful for increasing the feed conversion in the first reduction zone, for example in order to limit coke formation if necessary.

Buffer tank 280 is optional. A variant consists for example in sending directly from the outlet of cyclone 251 each sub-stream into the reduction reactor thereof by means of a dedicated siphon. Other devices of double outlet siphon type, or a siphon with an L-valve, can be used at the outlet of cyclone 251 for supplying fresh solid to each of the two reduction zones 220 and 240.

Figure 4:
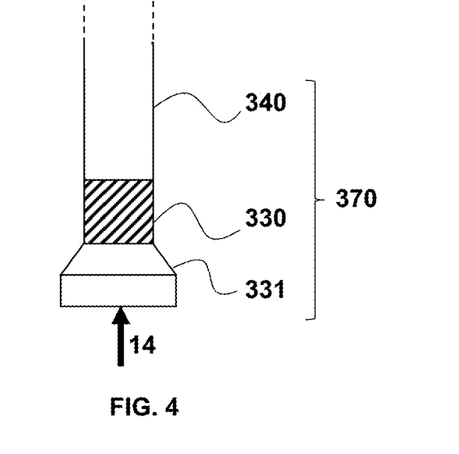
FIG. 4 is a diagram illustrating a variant of the first and second embodiments of the CLC plant according to the invention, showing a second reduction reactor comprising, at the base thereof, the reforming zone and a solid particle fines collection zone upstream from the reforming zone.

FIG. 4 schematically shows a cross-sectional view of a reduction reactor 370 integrating steam reforming zone 330 and reduction zone 340, which can be used according to the first and second embodiments of the invention. Only the lower part of the reactor is shown. The return leg of the siphon that feeds reduction zone 340 is not shown.

According to this embodiment, reduction reactor 370 comprises, at the base thereof, under the catalyst fixed bed of zone 330, a solid fine particles collection zone 331. Gas feed 14 from the first reduction reactor is first sent to this collection zone 331 prior to passing through the catalyst fixed bed of zone 330. This configuration involves the advantage of limiting clogging of the reforming catalyst fixed bed by possible oxygen carrier fines that may have formed through mechanical degradation (attrition).

This zone 331 can be a part of reactor 370 having a flared shape, wider at the bottom than at the top, i.e. wider from the reactor bottom to the steam reforming zone, as schematically illustrated in FIG. 4. It consists for example of a truncated part whose vertex is in contact with the steam reforming zone and extended at the bottom by a part with vertical walls.

Zone 331, due to its shape for example, allows to obtain a gas superficial velocity such that the solid particles heavier than the gas, comprising the oxygen carrier fines, are not carried along towards the steam reforming zone.

The oxygen carrier fines carried along in gas stream 14 are thus collected by applying a gas velocity decrease in this collection zone arranged between the first reduction zone and reforming zone 330.

Figure 5:
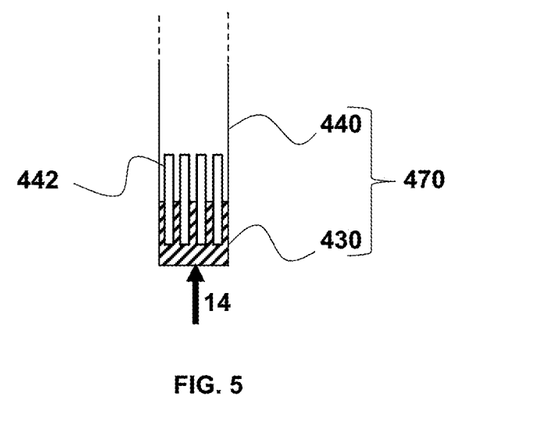
FIG. 5 is a diagram illustrating another variant of the first and second embodiments of the CLC plant according to the invention, showing a second reduction reactor comprising, at the base thereof, the reforming zone and means of heat conduction between the fixed bed of the reforming zone and the fluidized bed of the reduction zone.

FIG. 5 schematically shows a cross-sectional view of a reduction reactor 470 integrating steam reforming zone 430 and reduction zone 440, which can be used according to the first and second embodiments of the invention. Only the lower part of the reactor is shown. The return leg of the siphon that feeds reduction zone 440 is not shown.

The reforming catalyst fixed bed is partly heated by gas stream 14 coming from the first reduction reactor, and also by the additional heat source consisting of the fluidized bed of reduction zone 440, and more particularly by the oxygen-carrying solid whose heat capacity is higher than that of a gas.

According to this embodiment, heat conduction means between the fixed bed of reforming zone 430 and the fluidized bed of reduction zone 440 are arranged in contact with the two bed types, thus allowing to favour heat transfer from the fluidized bed to the reforming catalyst fixed bed.

For example, vertical tubes made of a thermally conductive material, metal tubes for example, are immersed in the fixed bed and in contact with the fluidized bed. The tubes are thus contiguous to both bed types. Any other device comprising a thermally conductive surface on contact with both the fixed bed and the fluidized bed can be used, so as to favour heat conduction between the two bed types.

Preferably, the thermally conductive material or the thermally conductive surface has a thermal conductivity above 10 W/(m·K), preferably above 20 W/(m·K).

EXAMPLES

Example 1

Example 1 is an example embodiment of the CLC process as implemented in FIG. 2.

We consider a chemical looping combustion plant operating natural gas containing almost 100% methane ($CH_4$). The composition of the gas, in volume fraction, is as follows:

| | |
|---|---|
| $CH_4$ | 95.05% |
| $C_2H_6$ | 1.77% |
| $C_3H_8$ | 0.57% |
| $C_4H_{10}$ | 0.27% |
| $C_5H_{12}$ | 0.11% |
| $CO_2$ | 0.76% |
| $N_2$ | 1.44% |
| He | 0.03% |

The oxygen carrier is a manganese-based metal oxide whose redox pair involved is $Mn_3O_4/MnO$.

The dimensioning of the first reduction reactor depends on the targeted methane conversion level so as to produce sufficient vapour for the steam reforming step.

In order to define the feed conversion and vapour production conditions, an experimental study is conducted in a 30 mm-diameter quartz reactor laden with 25 g SMR catalyst. The catalyst consists of pierced $Ni/Al_2O_3$ pellets (BASF SG-9301 containing 16.5 wt. % nickel oxide), crushed and screened between 1.6 mm and 3.15 mm (mean diameter 2.4 mm). The catalyst fixed bed in this reactor simulates the steam reforming zone.

Brought to temperature by an electric furnace, the reactor is fed at atmospheric pressure with a gas mixture consisting of methane, steam and $CO_2$ so as to reproduce the main components of the gas stream from first reduction step E1. A parametric study of the composition of this gas mixture, of the reaction temperature and the residence time on the catalyst leads to the following elements:

an S/C ratio of at least 1.5 allows to avoid coke formation on the catalyst and thus to durably maintain its activity and mechanical strength. This result has been obtained with a long-term 300-h test at the end of which the steam oxidation of the catalyst has shown no trace of carbon components (CO, $CO_2$) indicative of coke combustion. It is noted that this value is low in comparison with the operating conditions conventionally applied in industrial steam reforming for hydrogen production (between 2.5 and 3.5, more often between 2.5 and 3), with an S/C ratio of at least 1.5, a residence time of 0.1 s is sufficient to convert 99% of the methane for temperatures above 800° C.

From methane combustion equation (9) below, we deduce that a 43% methane conversion level needs to be reached in the first reduction reactor in order to obtain an S/C ratio of 1.5.

$$CH_4 + 2\,O_2 \rightarrow CO_2 + 2\,H_2O \qquad (9).$$

Example 2

Example 2 is a simplified numerical example illustrating the heat capacity of the oxygen-carrying solid available in the case of a plant according to a series configuration as illustrated in FIG. 2 and a plant according to a parallel configuration as illustrated in FIG. 3.

We consider a 200-MWth CLC plant treating a gaseous hydrocarbon feed consisting of 100% methane ($CH_4$).

We consider a methane flow rate $m_{CH4}$ of 4 kg/s (i.e. 250 mol/s) and a total metal oxide solid flow rate of 805 kg/s.

Assuming a methane conversion ratio X equal to 40% in the first reduction reactor, the gas stream at the first reduction reactor outlet, entering the steam reforming zone at the base of the second reduction reactor, then consists of unconverted $CH_4$ (150 mol/s), $CO_2$ (100 mol/s) and $H_2O$ vapour (200 mol/s).

We assume that the temperature of the oxygen-carrying solid leaving oxidation reactor (110, 210) is 1000° C. We assume that:

in the series configuration, the temperature of the oxygen-carrying solid leaving first reduction reactor 120 and entering reduction zone 140 of second reduction reactor 170 is 800° C., in the parallel configuration, the temperature of the oxygen-carrying solid entering reduction zone 240 of second reduction reactor 270 is equal to the temperature of the oxygen-carrying solid at the outlet of oxidation reactor 210, i.e. 1000° C.

We consider that all of the heat from the endothermic SMR reaction is drawn from the metal oxide entering the second reduction reactor. This assumption is made only for the purpose of comparison between the series and parallel modes, and it should not be understood to be in contradiction with the rest of the description, which shows in particular that part of the heat required for the steam reforming reaction can also be supplied by the gas stream feeding the reforming zone.

With this assumption, we can write:

with:

the SMR reaction enthalpy $\Delta H_{SMR} = +206$ kJ/mol, $Cp_{solid}$ the specific heat of the metal oxide=26 J·mol$^{-1}$·K$^{-1}$ with a molar mass of 55 g/mol, $\Delta T_{solid}$ the difference between the temperature of the oxygen-carrying solid after heat exchange with the SMR catalyst fixed bed and the temperature of the oxygen-carrying solid entering the second reduction reactor (in the reduction zone).

In the case of the series configuration, the flow $m_{solid}$ entering second reduction reactor 170 is equal to the total solid flow rate of 805 kg/s, at a temperature of 800° C. In this case, we have $\Delta T_{solid} = 81°$ C., i.e. a temperature of the oxygen carrier after heat exchange with the SMR catalyst fixed bed of 800−81=719° C.

In the case of the parallel configuration, flow $m_{solid}$ is equal to the product of (1−X), X being the methane conversion ratio, equal to 40%, by the total solid flow rate, i.e. (1−0.4)×805=483 kg/s, at a temperature of 1000° C. In this case, we have $\Delta T_{solid} = 135°$ C., i.e. an oxygen carrier temperature after heat exchange with the SMR catalyst fixed bed of 1000−135=865° C.

The SMR reaction thus is favoured in the case of the parallel configuration where the temperature at the SMR catalyst bed is higher.

In order to favour heat transfer between the circulating oxygen-carrying solid bed and the SMR catalyst fixed bed in the bottom of the second reduction reactor, heat conductive tubes can be arranged contiguously between these two solids (metal oxide and SMR catalyst).

Example 3

Example 3 is a simplified numerical example illustrating the pressure drop management in a plant according to the invention.

We take the configuration given in Example 1, except for the methane residence time in the fixed bed: we consider in this example a methane residence time of 0.2 s in the SMR catalyst fixed bed.

In order to minimize the pressure drop in the SMR catalyst fixed bed, the diameter in the bottom of the second reduction reactor comprising the fixed bed is multiplied by 2. The gas velocity is thus divided by 4.

Considering a gas velocity in the second reduction reactor of 7 m/s to ensure transport of the oxygen-carrying solid, the gas velocity at the outlet of the SMR catalyst fixed bed is estimated at 1.75 m/s (gas velocity in the second reactor divided by 4). At the fixed bed inlet, considering a 170% molar expansion of the SMR reaction, the gas velocity is 1.75/1.7=1.0 m/s. The average gas velocity at the fixed bed thus is (1+1.75)/2=1.35 m/s. To ensure a residence time of 0.2 s, the SMR catalyst fixed bed height thus is 0.3 m.

According to pressure drop measurements performed on three types of commercial SMR catalysts (KATALCO$_{JM}$™ 57-4Q and 57-4MQ by Johnson Matthey, and SG-9301 by BASF), the pressure drop is estimated, according to the Ergun equation, at about 30 mbar/m for a gas velocity of 1.35 m/s. For an SMR catalyst fixed bed height of 0.3 m, the pressure drop thus is about 10 mbar.

Such a pressure drop can be compensated for by a variation in the oxygen- carrying solid height in the legs of the siphons feeding the reactors.

For indication only, a 100 mbar pressure variation between first reduction reactor 120 and second reduction reactor 170 generates a variation in the solid height in intermediate siphon of 0.5 m, using for example as the oxygen carrier a natural manganese ore of pyrolusite type with a density of 3300 kg/m$^3$.

The invention claimed is:

1. A method for chemical looping oxidation-reduction combustion of a gaseous hydrocarbon feed, comprising:
    sending the gaseous hydrocarbon feed to a first fluidized-bed reduction zone to perform partial combustion of the gaseous hydrocarbon feed on contact with a first stream of particles including a redox active mass, a mixture comprising at least part of the first stream of particles and a gas stream exiting the first fluidized-bed reduction zone,
    separating the gas stream from the at least part of the first stream of particles in order to send the gas stream to a reforming zone,
    carrying out catalytic steam reforming of the gas stream in the reforming zone comprising a reforming catalyst fixed bed in order to produce a gaseous effluent comprising syngas,
    sending the gaseous effluent to a second fluidized-bed reduction zone to perform combustion of the gaseous effluent on contact with a second stream of particles including a redox active mass, the second fluidized-bed reduction zone being separate from the first fluidized-bed reduction zone, at least part of the second stream of particles exiting the second fluidized-bed reduction zone,
    oxidizing the at least part of the first stream of particles that have exited the first fluidized-bed reduction zone and the at least part of the second stream of particles that have exited the second fluidized-bed reduction zone by contacting with an oxidizing gas stream in a fluidized-bed oxidation zone.

2. A method as claimed in claim 1, wherein contacting the at least part of the first stream of particles and the at least part of the second stream of particles with the oxidizing gas stream produces oxidized active mass particles and an oxygen-depleted oxidizing gas stream, at least part of the oxidized active mass particles is separated from the oxygen-depleted oxidizing gas stream after oxidation in the fluidized-bed oxidation zone, the at least part of the oxidized active mass particles is fed to the first fluidized-bed reduction zone, and the second stream of particles in the second fluidized-bed reduction zone comprises the at least part of the first stream of particle having exited the first fluidized-bed reduction zone.

3. A method as claimed in claim 1, wherein contacting the at least part of the first stream of particles and the at least part of the second stream of particles with the oxidizing gas stream produces oxidized active mass particles and an oxygen-depleted oxidizing gas stream, at least part of the oxidized active mass particles is separated from the oxygen-depleted oxidizing gas stream after oxidation in the fluidized-bed oxidation zone, a first portion of the least part of the oxidized active mass particles is fed to the first fluidized-bed reduction zone and a second portion of the least part of the oxidized active mass particles is fed to second fluidized-bed reduction zone.

4. A method as claimed in claim 3, wherein the at least part of the oxidized active mass particles separated from the oxygen-depleted oxidizing gas stream is sent to a tank prior to separating the first portion of the least part of the oxidized active mass particles and the second portion of the least part of the oxidized active mass particles.

5. A method as claimed in claim 1, wherein the partial combustion in the first fluidized-bed reduction zone is controlled in such a way that steam is produced in sufficient amount for catalytic steam reforming of the gas stream.

6. A method as claimed in claim 1, wherein the steam to carbon ratio S/C is greater than or equal to 1.5 in the gas stream from the first fluidized-bed reduction zone.

7. A method as claimed in claim 1, wherein the gaseous hydrocarbon feed conversion ratio ranges between 40% and 80% in the first fluidized-bed reduction zone.

8. A method as claimed in claim 1, wherein redox active mass fines carried along with the gas stream are collected before the gas stream flows into the reforming zone by decreasing the gas velocity in a collection zone arranged between the first fluidized-bed reduction zone and the reforming zone.

9. A method as claimed in claim 1, wherein a heat exchange is performed between the reforming catalyst fixed bed and a fluidized bed of the second fluidized-bed reduction zone by vertical tubes made of a thermally conductive material.

10. A method as claimed in claim 9, wherein the vertical tubes comprise metal tubes contiguous to the fixed bed and to the fluidized bed.

11. A method as claimed in claim 1, wherein the gaseous hydrocarbon feed comprises methane and the reforming catalyst fixed bed comprises nickel.

12. A method as claimed in claim 1, wherein the redox active mass comprises metal oxides extracted from ores.

13. A method as claimed in claim 1, wherein the gaseous hydrocarbon feed conversion ratio ranges between 40% and 60% in the first reduction zone.

14. A plant for combustion of a gaseous hydrocarbon feed as claimed in claim 1, comprising:

a first fluidized-bed reduction zone provided, at the base thereof, with an inlet configured for injecting the gaseous hydrocarbon feed and with an inlet for a first stream of particles including a redox active mass, and the first fluidized-bed reduction zone provided at the top thereof with an outlet for a mixture comprising a gas stream and at least part of the first stream of particles exiting the first fluidized-bed reduction zone, a separation device receiving the mixture for separating the gas stream from the at least part of the first stream of particles, a steam reforming zone comprising a reforming catalyst fixed bed, an inlet for the gas stream at the base of the reforming catalyst fixed bed and an outlet for a gaseous effluent comprising syngas, a second fluidized-bed reduction zone provided, at the base thereof, with an inlet for the gaseous effluent and a feed point for a second stream of particles including a redox mass, the second fluidized-bed reduction zone provided at the top thereof with an outlet for fumes, the second fluidized-bed reduction zone comprising an outlet for at least a part of the second stream of particles exiting the second fluidized-bed reduction zone, and the second fluidized-bed reduction zone being separate from the first fluidized-bed reduction zone, an oxidation zone provided, at the base thereof, with a feed point for the at least part of the first stream of particles that have exited the first fluidized-bed reduction zone and the at least part of the second stream of particles that have exited the second fluidized-bed reduction zone, the oxidation zone being provided with an inlet configured for injecting an oxidizing fluidization gas, and the oxidation zone being provided at the top thereof with an outlet for an oxygen-depleted oxidizing gas and oxidized redox active mass particles.

15. A plant as claimed in claim 14, wherein the feed point for the second stream of particles in the second fluidized-bed reduction zone is connected to the separation device.

16. A plant as claimed in claim 14, comprising a second separation device receiving the oxygen-depleted oxidizing gas and the oxidized redox active mass particles from the oxidation zone, wherein the inlet for the first stream of particles in the first fluidized-bed reduction zone and the feed point for the second stream of particles in the second fluidized-bed reduction zone are each connected to the second separation device.

17. A plant as claimed in claim 16, wherein the inlet for the first stream of particles in the first reduction zone and the feed point for the second stream of particles in the second reduction zone are each connected to the second separation device by a tank.

18. A plant as claimed in claim 14, wherein the first fluidized-bed reduction zone comprises a first reactor, the plant further comprises a second reactor including the reforming zone and the second fluidized-bed reduction zone, and wherein the second reactor comprises vertical tubes made of a thermally conductive material contiguous to the reforming catalyst fixed bed and to a fluidized bed of the second fluidized-bed reduction zone for achieving a heat exchange between the reforming catalyst fixed bed and the fluidized bed.

19. A plant as claimed in claim 18, wherein the thermally conductive material comprises metallic tubes.

20. A plant as claimed in claim 14, further comprising a collection zone provided between the first fluidized-bed reduction zone and the reforming zone for collecting oxygen carrier fines carried along in the gas stream, the collection zone being part of a reactor including the second fluidized-bed reduction zone, and the collection zone comprising a truncated part whose vertex is in contact with the reforming zone.

* * * * *